United States Patent
Waters

(10) Patent No.: US 8,918,549 B2
(45) Date of Patent: Dec. 23, 2014

(54) ROBUST CABLE-TYPE DETECTION FOR USB POWER DELIVERY

(71) Applicant: Texas Instruments Incorporated, Dallas, TX (US)

(72) Inventor: Deric Wayne Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/969,170

(22) Filed: Aug. 16, 2013

(65) Prior Publication Data

US 2014/0173141 A1 Jun. 19, 2014

Related U.S. Application Data

(60) Provisional application No. 61/738,937, filed on Dec. 18, 2012.

(51) Int. Cl.
G06F 3/00 (2006.01)
G06F 1/22 (2006.01)

(52) U.S. Cl.
CPC .................................. *G06F 1/22* (2013.01)
USPC .......................................................... 710/16

(58) Field of Classification Search
CPC ....................................................... G05F 1/66
See application file for complete search history.

(56) References Cited

U.S. PATENT DOCUMENTS

| | | | |
|---|---|---|---|
| 6,452,975 B1 * | 9/2002 | Hannah | 375/257 |
| 2002/0062456 A1 * | 5/2002 | Mariaud et al. | 713/340 |
| 2005/0141208 A1 * | 6/2005 | Niinuma | 361/797 |
| 2008/0222438 A1 * | 9/2008 | Lin et al. | 713/340 |
| 2009/0109639 A1 | 4/2009 | Li | |
| 2010/0293302 A1 * | 11/2010 | Fujii et al. | 710/16 |
| 2010/0299449 A1 * | 11/2010 | Terlizzi | 709/237 |
| 2012/0086428 A1 | 4/2012 | Bradley et al. | |
| 2012/0249119 A1 | 10/2012 | Wada et al. | |
| 2012/0297207 A1 | 11/2012 | Carlsen et al. | |

OTHER PUBLICATIONS

PCT Search Report mailed Apr. 17, 2014.

* cited by examiner

*Primary Examiner* — Elias Mamo
(74) *Attorney, Agent, or Firm* — William B. Kempler; Frederick J. Telecky, Jr.

(57) ABSTRACT

A system and method for detecting a USB cable-type. A USB PD device configured at a near end of a USB cable is configured to (i) receive and process a signal from a device at a far end of the USB cable to determine a power rating of the USB cable and (ii) adjustably establish power delivered by the first device to the USB cable as a function of the determined USB cable power rating.

23 Claims, 6 Drawing Sheets

ROBUST CABLE-TYPE DETECTION FOR USB POWER DELIVERY

CLAIM OF PRIORITY

This application claims priority of U.S. patent application Ser. No. 61/738,937 Entitled ROBUST CABLE-TYPE DETECTION FOR USB POWER DELIVERY filed Dec. 18, 2012, the contents of which are incorporated herein by reference in their entirety.

TECHNICAL FIELD

This disclosure is generally directed to Universal Serial Bus (USB) cables and more particularly to USB power-delivery (PD) cables.

BACKGROUND

A new USB power delivery (PD) specification is under development to enable delivery of higher power over new USB cables and connectors. The intent for this technology is to create a universal power plug for laptops, tablets, and other devices that may require more than 5V. The USB PD specification defines a communication link between ports connected via a USB-PD cable and connectors. The communication is designed to be half-duplex and packet-based. The packets contain various information that enables the two ports to communicate and negotiate, including the voltage and the current that the source port will provide to the sink port. The ports can even negotiate to switch roles (Source to Sink and vice versa). The underlying communication in the USB PD specification is binary frequency shift keying (FSK). This communication happens independently from normal USB communications that go through the same cable but over different wires. The USB PD communication goes over the "Vbus" wire rather than the USB data wires.

Since legacy cables and even new PD cables have different current ratings, one piece of the new specification is the ability to detect the cable-type and thereby know the current rating of a cable. USB PD devices are not allowed to request or offer a voltage or current exceeding the ratings of the cable. Legacy cables (standard B, standard A, micro-A or micro-B) are limited to 1.5 A and 5V. PD micro cables (type A and B) are limited to 3 A. PD standard cables are limited to 5 A.

In an equivalent circuit for transmission in a USB PD system, ideally rTX=Z0 so that there are not any reflections from the cable during transmission. In some cases, the receiver may also use a value of rRX approximately equal to Z0 so that there are not reflections back onto the cable. In other cases, the receiver may have rRX set to a value much greater than Z0, in which case the line is effectively not terminated. In the latter case, if the cable length is approximately a quarter of a wavelength, the voltage seen at the input to the cable on the TX side is close to zero. This creates some challenges for a conventional USB PD system.

SUMMARY

Embodiments of this disclosure include a system and method for detecting a USB cable-type. A USB PD device configured at a near end of a USB cable is configured to (i) receive and process a signal from a device at a far end of the USB cable to determine a power rating of the USB cable and (ii) adjustably establish power delivered by the first device to the USB cable as a function of the determined USB cable power rating.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
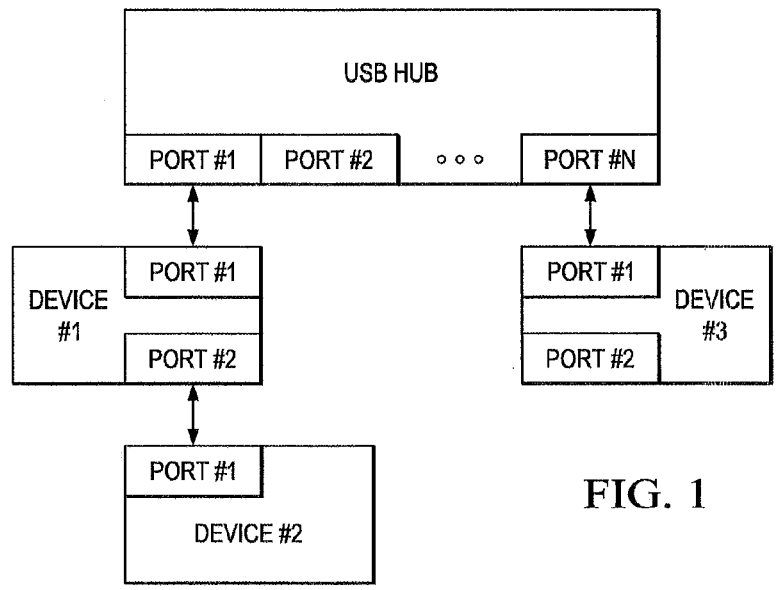
FIG. 1 illustrates how USB PD devices may be deployed, where any given device could be a Provider/Consumer (P/C), Consumer/Provider (C/P), Provider-only, or Consumer-only.
Figure 2:
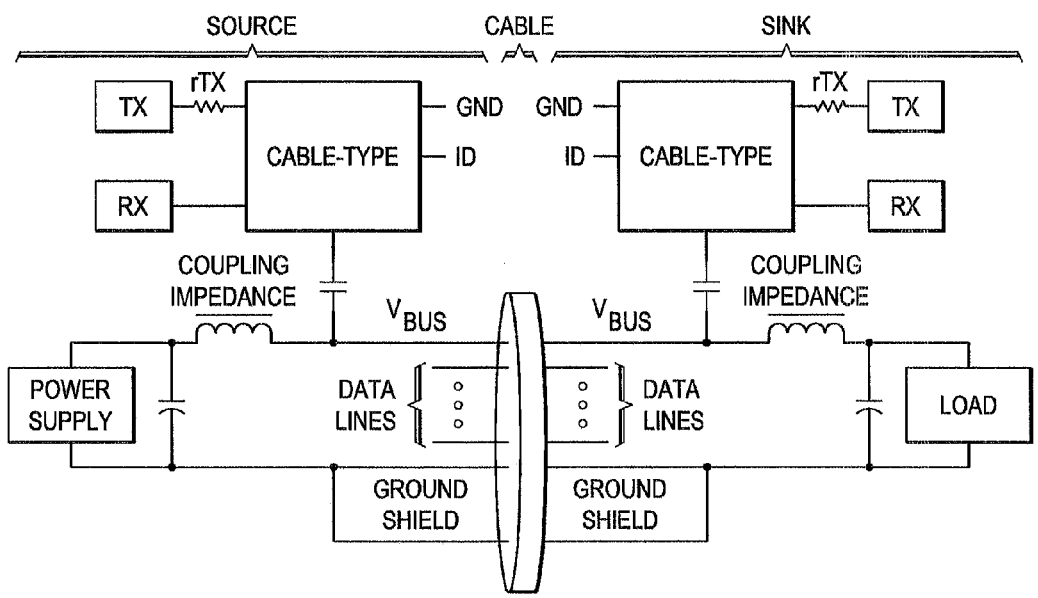
FIG. 2 illustrates a circuit of how two ports may be connected.
Figure 3:
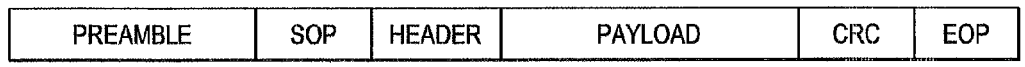
FIG. 3 illustrates a packet structure for a typical packet.

FIG. 1 illustrates how USB PD devices may be deployed, where any given device could be a Provider/Consumer (P/C), Consumer/Provider (C/P), Provider-only, or Consumer-only. FIG. 2 illustrates a circuit of how two ports may be connected. FIG. 3 illustrates a packet structure for a typical packet. A preamble is followed by a start of packet (SOP), a header, a payload (if any), a cyclic redundancy check (CRC) (such as a 32-bit value) covering the header and payload, and an end of packet (EOP). Control messages are packets that do not have any payload. This disclosure mentions some of the specific kinds of control messages, and the details of their definition are provided herein for clarity. Table 1 shows how the header is defined.

TABLE 1

| Message Header | | |
|---|---|---|
| Bit(s) | Field Name | Notes |
| 15 | Reserved | Shall be set to 0 |
| 14 . . . 12 | Number of Data Objects | |
| 11 . . . 9 | MessageID | See Table 2 |
| 8 | Port Role | |
| 7 . . . 6 | Specification Revision | |
| 5 . . . 4 | Reserved | Shall be set to 0 |
| 3 . . . 0 | Message Type | |

For Control messages, the Number of Data Objects is set to 000. The definition of the Message Type field is shown in Table 2. The other non-reserved fields may have any value. There are 13 different control messages shown in Table 2.

TABLE 2

Control Message Types

| Bits 3...0 | Message Type | Sent by | Description |
|---|---|---|---|
| 0000 | Reserved | N/A | All values not explicitly defined are reserved and shall not be used. |
| 0001 | GoodCRC | Source or Sink | |
| 0010 | GotoMin | Source only | |
| 0011 | Accept | Source or Sink | |
| 0100 | Reject | Source or Sink | |
| 0101 | Ping | Source only | |
| 0110 | PS_RDY | Source only | |
| 0111 | Get_Source_Cap | Source or Sink | |
| 1000 | Get_Sink_Cap | Source or Sink | |
| 1001 | Protocol Error | Source or Sink | |
| 1010 | Swap | Source or Sink | |
| 1011 | Reserved | Sink only | |
| 1100 | Wait | Source only | |
| 1101 | Soft Reset | Source or Sink | |
| 1110-1111 | Reserved | N/A | All values not explicitly defined are reserved and shall not be used. |

Figure 4:
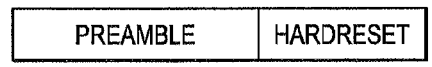
FIG. 4 illustrates a hard reset packet structure.
Figure 5:
FIG. 5 illustrates a bitstream signal structure of a preamble.

FIG. 4 illustrates a hard reset packet structure. FIG. 5 illustrates a bitstream signal structure of a preamble.

In USB PD terminology, a device's capabilities include the amount of current and voltage it can source and/or sink. A device may not be permitted to offer or request current exceeding the capability of the cable. That is why cable-type detection is such an important part of the USB PD system.

Figure 6:
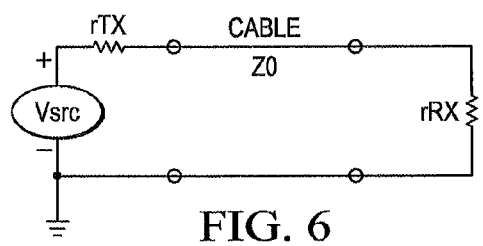
FIG. 6 illustrates an equivalent circuit for a transmitter and receiver.

FIG. 6 illustrates an equivalent circuit for a transmitter and receiver. Ideally, rTX=Z0 so that there are not any reflections from the cable during transmission. In some cases, the receiver may also use a value of rRX approximately equal to Z0 so that there are not reflections back onto the cable. In other cases, the receiver may have rRX set to a value much greater than Z0, in which case the line is effectively not terminated. In the latter case, if the cable length is approximately a quarter of a wavelength, the voltage seen at the input to the cable on the transmitter (TX) side is close to zero. This creates some challenges for a conventional USB PD system.

Figure 7:
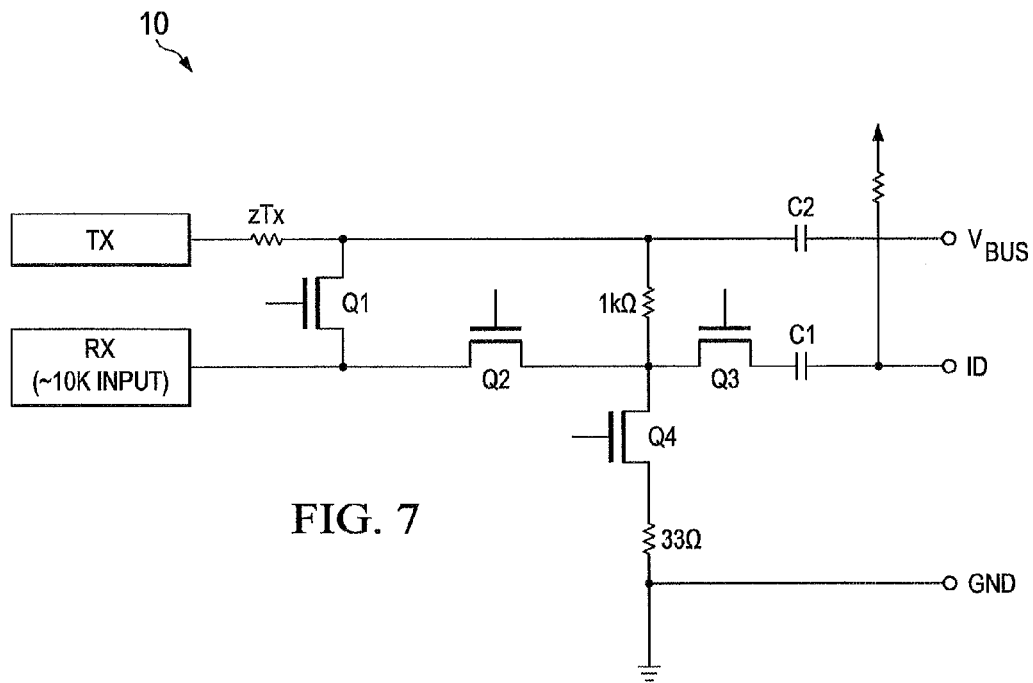
FIG. 7 illustrates a cable-type detection circuit for non-Standard-A receptacles.
Figure 8:
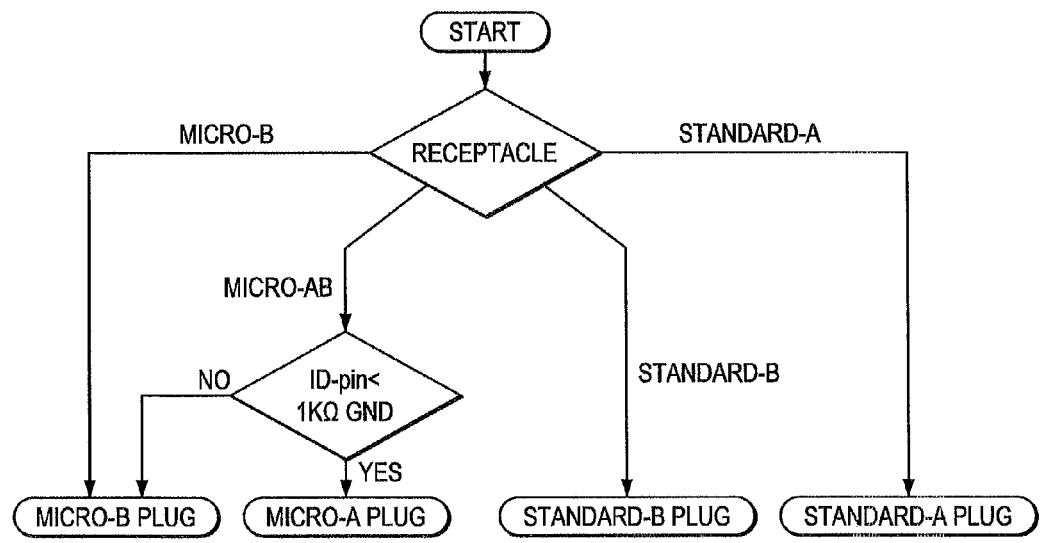
FIGS. 8 and 9 illustrate methods of determining plug type.
Figure 9:
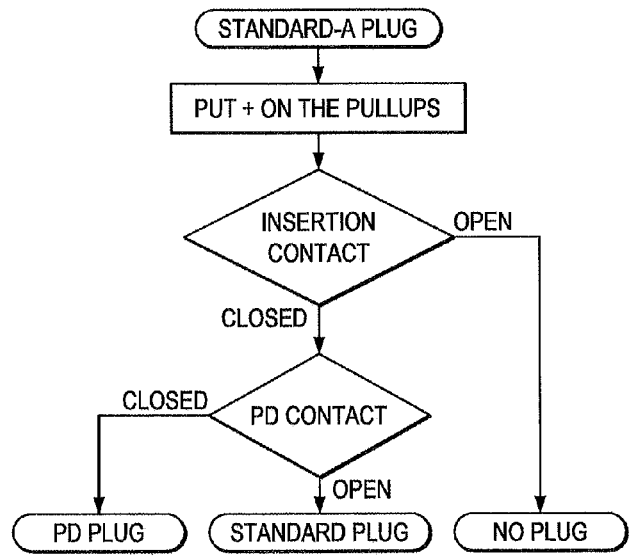

FIG. 7 illustrates a cable-type detection circuit 10 for non-Standard-A receptacles. The circuit 10 shown in FIG. 7 may be used to detect the electronic markings on an ID pin indicating the type of micro-connector of a cable. FIGS. 8 and 9 illustrate methods of determining plug type. The transmitter (TX) is used to put a carrier signal on the "Vbus" line on the near end of the cable, and the receiver (RX) is used to detect whether a signal is present or not at the near end of the cable (typically a Squelch receiver is used for this purpose). Switches Q1-Q4 are used to create a series of circuits where the voltage output (as measured by the RX) in each step is used to determine the configuration of the plug in accordance with Table 3 below. In normal operation, switch Q1 is conducting (turned ON), and switches Q2-Q4 are not conducting (turned OFF). In order to check the plug type using the circuit in FIG. 8, a series of steps can be performed, and the result of each step can be recorded as a "0" or "1." The steps could include:

1) Transistors Q1, Q3, and Q4 are not conducting (turned OFF).
2) Transistor Q2 is conducting (turned ON).
3) Check Squelch→open—"1", else "0"→bit 1.
4) Transistor Q3 is conducting (turned ON).
5) Check Squelch→open—"1", else "0"→bit 2.
6) Transistor Q4 is conducting (turned ON).
7) Check Squelch→open—"1", else "0"→bit 3.

Table 3 below summarizes the results.

Figure 11A:
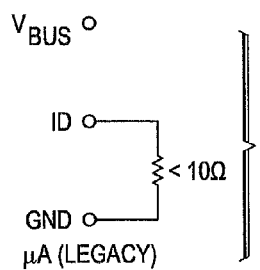
FIGS. 11A-11C illustrate schematics of A plug connector markers.
Figure 11B:
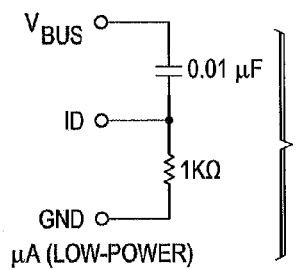
Figure 11C:
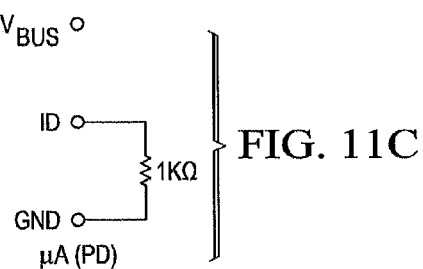
Figure 12A:
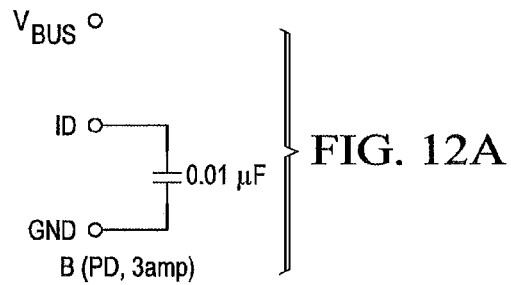
FIGS. 12A and 12B illustrate schematics of B plug connector markers.
Figure 12B:
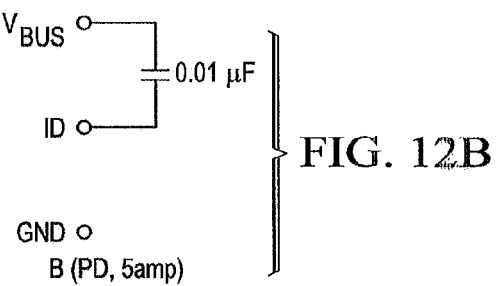

In Step 3, if Vbus is short-circuited (due to an unterminated cable whose length is a quarter of a wavelength, such as roughly 2.5 m), the undesirable result of the cable-type detection is Fault, which may or may not be the case. This means that, using this circuit and algorithm, the cable-type cannot be determined. Other circuits may be able to detect some cable types using a DC voltage that is not connected to Vbus, for example, to detect a resistor between the ID and GND pins. FIGS. 11A-11C illustrate schematics of A plug connector markers, which operate in this manner. Other circuits would not be able to solve this problem completely since, in some cases, the voltage on Vbus needs to be considered to detect if there is a capacitor between it and the ID pin. FIGS. 12A and 12B illustrate schematics of B plug connector markers, which operate in this manner.

The squelch receiver referred to above is a circuit that detects if there is a signal on the line with a large amplitude. Typically, it should trigger (be open) when the signal level exceeds 20 mVrms. The functionality of the squelch receiver may sometimes be replaced by an FSK receiver, which will be "open" if it can demodulate bits reliably.

TABLE 3

Plug Type Determination

| bit 1 | bit 2 | bit 3 | Micro A plug | Micro B or PD Standard B plug | Approx. level at RX when detecting bit 1 | Approx. level at RX when detecting bit 2 | Approx. level at RX when detecting bit 3 |
|---|---|---|---|---|---|---|---|
| 1 | 1 | 1 | Low Power | PD (5A) | ~0 dB | ~0 dB | ~−9 dB |
| 1 | 1 | 0 | PD | Legacy | ~0 dB | ~−6 dB (PD) ~0 dB (Legacy) | ~−30 dB |
| 1 | 0 | 1 | Fault | Fault | | | |
| 1 | 0 | 0 | Legacy | PD (3A) | ~0 dB | ~−40 dB | ~−40 dB |
| 0 | 1 | 1 | Fault | Fault | | | |
| 0 | 1 | 0 | Fault | Fault | | | |

TABLE 3-continued

Plug Type Determination

| bit 1 | bit 2 | bit 3 | Micro A plug | Micro B or PD Standard B plug | Approx. level at RX when detecting bit 1 | Approx. level at RX when detecting bit 2 | Approx. level at RX when detecting bit 3 |
|---|---|---|---|---|---|---|---|
| 0 | 0 | 1 | Fault | Fault | | | |
| 0 | 0 | 0 | Fault | Fault | | | |

In accordance with this disclosure, the disclosed cable-type detection mechanism and method advantageously use and process a packet transmitted by a far-end of a USB PD cable to detect the presence of capacitors in one or both plugs of the cable. This detection mechanism is coupled to a USB receptacle of a USB PD device and may reside in the USB PD device, although other configurations are envisioned. The detection mechanism is described in the context of the cable-type detection circuit 10 in FIG. 7 in view of FIG. 10, FIGS. 11A-11-C, and FIGS. 12A-12B. This mechanism can be extended to other circuits, as well.

In some embodiments, the detection mechanism resides in a near end USB PD device and is coupled to a receptacle that receives a near end of a USB PD cable. The USB PD device is configured to receive and process a characteristic signal, such as an AC signal or packet data, sent by a far-end device of the cable on Vbus (instead of the near-end device generating its own AC signal). This overcomes the problem when the near-end device always sees close to 0V on Vbus when it sends an AC signal on Vbus (due to an unterminated cable as previously described). The USB PD device is configured to deliver power to the far end device 44 while simultaneously detecting the presence of the characteristic signal from the far end device 44.

Figure 10:
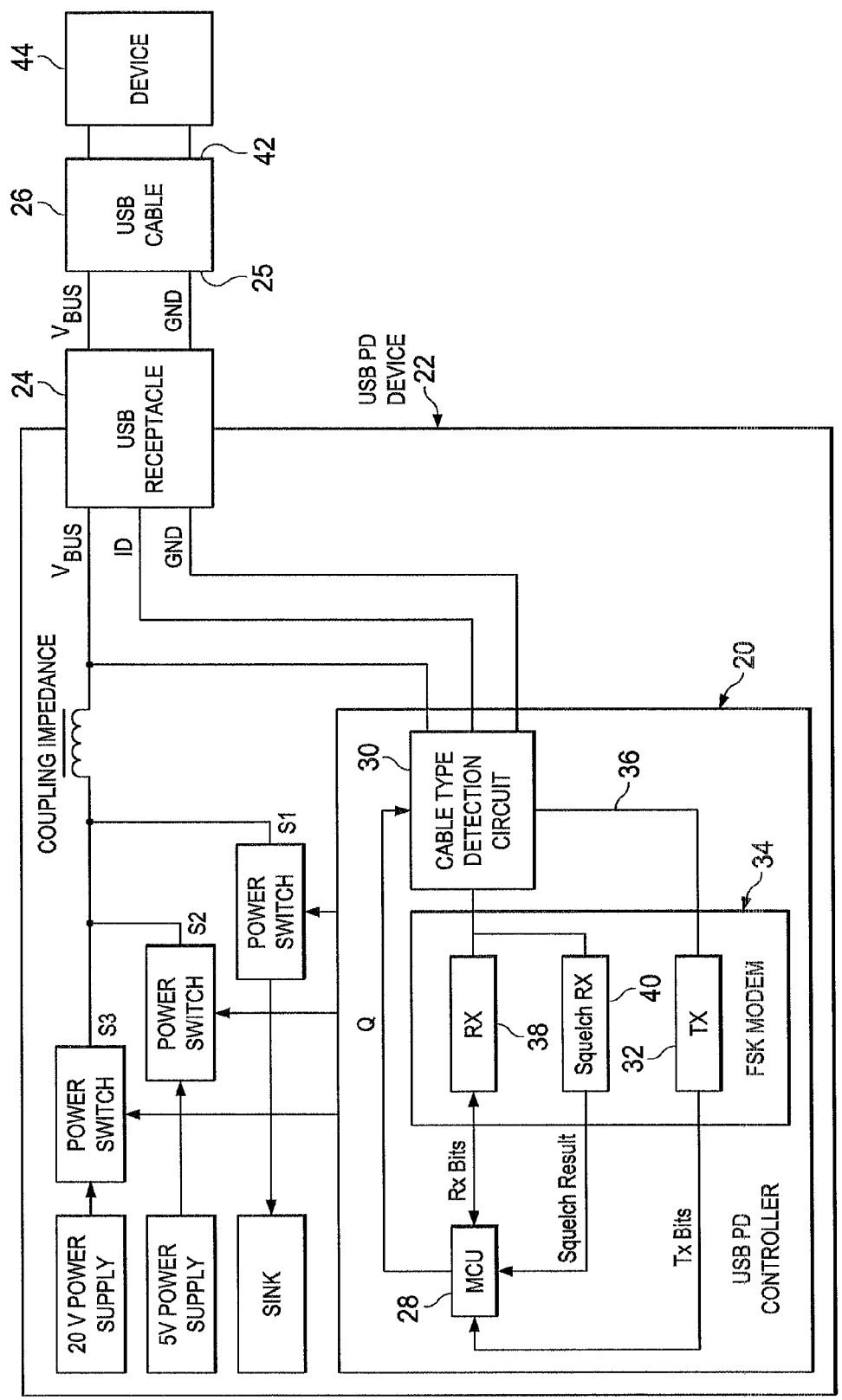
FIG. 10 illustrates a system block diagram of an example USB PD device according to this disclosure.
Figure 13:
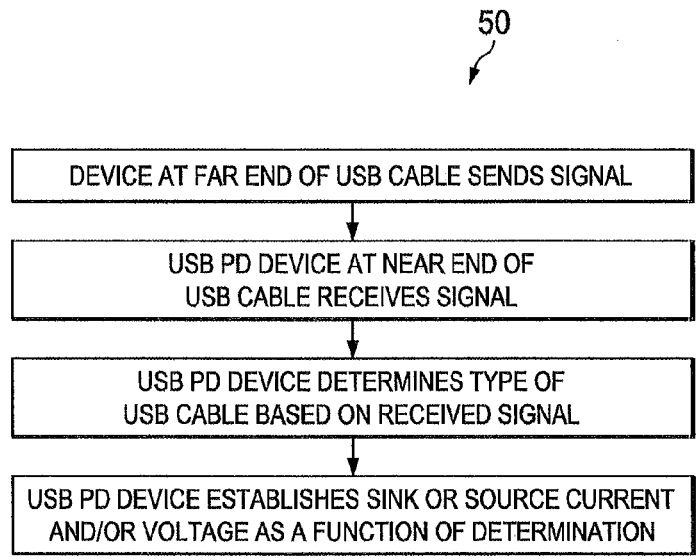
FIG. 13 illustrates an example method according to this disclosure.

FIG. 10 illustrates a system block diagram of an example USB PD device according to this disclosure, and FIG. 13 illustrates an example method 50 according to this disclosure. A USB PD controller 20 is configured to reside in or otherwise be associated with a USB PD device 22. The USB PD controller 20 is coupled to a USB receptacle 24, which is configured to receive a near end 25 of a cable 26. Other applications may also use the USB PD Controller 20 and the cable-type detection mechanism outlined below.

In FIG. 10, Q is a vector representing the values of the switch states of the transistors Q1-Q4 shown in FIG. 7 and previously discussed. A multipoint control unit (MCU) or other logic device 28 controls a cable-type detection circuit 30 through Q. A TX block 32 in an FSK modem 34 may or may not terminate a line 36 coming from the cable-type detection circuit 30. A RX block 38 and/or a Squelch RX block 40 terminates the line from the USB receptacle 24 with a large resistance or impedance. The RX block 38 can pass demodulated bits to the logic device 28, although it may deliver only the header and payload uncoded bits along with the packet type. The logic device 28 carries out protocol, policy engine, and device policy manager functions. The policy engine interprets the policy manger's input in order to implement policy for a given port and directs the protocol layer to send appropriate messages. The device policy manager applies local policy to each port via the policy engine. In some embodiments, the logic device 28 may also carry out other functions, such as CRC detection, 4b5b decoding, or other functions.

The exact division of tasks between the logic device 28 and the RX block 38 can vary depending on the design parameters. The logic device 28 is configured to send bits it wants to transmit to the TX block 32. The TX block 32 may add 4b5b encoding, a preamble, SOP, CRC, and/or EOP, and the logic device 28 is not necessarily required to construct the exact packet. Based on the characteristic signal generated by a far end device 42 at a far-end 44 of the cable 26, the logic device 28 is configured to process the received signals and responsively send signals to external power switches S1-S3 to control parameters of the Vbus line connected to the power system of the device. For example, it may sink 5V or source 20V.

The USB PD device 22 connected to receptacle 36 can assume a legacy cable 21 is attached until it knows otherwise, as this protects it from offering or requesting current from a far-end device that may exceed the cable capability. The USB PD device 22 can execute the cable-type detection procedure described above. If the result is a "Fault" because bit 1=0, the procedure described below can then be executed. Otherwise, the cable-type is already known using the cable-type detection procedure described above.

Standard-B Receptacle

A USB PD device 22 with a Standard-B receptacle is a C/P or C-only device. According to the USB-PD system, the first data packet characteristic signal that the device 22 receives from the far-end device 44 of the cable 26 is more than likely either a Capabilities message, a HardReset packet, or a Bit-Stream. It is also allowed to send a Get_source_cap message and a SoftReset message, in which case it may receive a GoodCRC message.

If the cable-type is unknown, the USB PD device 22 with a standard-B receptacle 24 may know that the cable 26 is either PD (5 A), PD (3 A), or a legacy cable. The USB PD device 22 can wait until it receives a data packet from the far-end device 44 of the cable 26 to determine the cable type. When the far-end device 44 on the cable 26 sends a data packet, the Vbus wire does not appear to the USB PD device 22 to be shorted any more. While waiting for the first packet, transistor Q1 is closed while transistors Q2-Q4 are open. The following steps can be followed according to one embodiment to determine cable type:

1. When the squelch RX 40 and/or FSK modem 34 detects a data packet arriving, open transistor Q1 and close transistors Q2 and Q3.
2. If the squelch RX 40 and/or FSK modem 34 still detects a packet, there is a capacitor coupling the Vbus and ID pins as shown in FIG. 12B. The cable type is PD (5 A). Close transistor Q1, and open transistors Q2-Q4. Exit the procedure.
3. Else, close transistor Q1 (transistors Q2 and Q3 remain closed).
4. If the squelch RX 40 and/or FSK modem 34 detects a packet, there is not a capacitor coupling the ID and GND pins. The cable type is Legacy as shown in FIG. 11A. Close transistor Q1, and open transistors Q2-Q4. Exit the procedure.
5. Else, open transistors Q2 and Q3 (transistor Q1 remains closed).

6. If the squelch RX 40 and/or FSK modem 34 detects a packet, there is a capacitor coupling the ID and GND pins as shown in FIG. 12A. The cable type is PD (3 A). Close transistor Q1, and open transistors Q2-Q4. Exit the procedure.
7. Else, the cable type is still unknown. Close transistor Q1, and open transistors Q2-Q4. Exit the procedure.

Note that following this procedure may cause the packet CRC to fail. The protocol handles this failure and causes more packets to be sent. After some attempts, if the cable-type is still undetermined, the device may choose to assume it is a legacy cable. Alternatively, to avoid causing issues in the policy engine the device may choose to perform the cable-type detection mechanism on a subset of the arriving packets. This ensures that packets that are retried will be processed as the policy engine expects avoiding hard resets that would disrupt the normal USB PD operation. For example, only every other packet could be used.

Micro-B Receptacle

A USB PD device 22 with a Micro-B receptacle 24 is a C/P or C-only device. According to the USB-PD system, the first data packet that the device 22 receives from the far-end device 44 of the cable 26 is more than likely either a Capabilities message, a HardReset packet, or a BitStream. It is also allowed to send a Get_source_cap message and a SoftReset message, in which case it may receive a GoodCRC message.

If the cable-type is unknown, the USB PD device 22 with a Micro-B receptacle 24 may know that the cable 26 is either PD (3 A) as shown in FIG. 12A or a legacy cable as shown in FIG. 11A. The USB PD device 22 can wait until it receives a data packet from the far-end device 44 on the cable 26 to determine the cable type. When the far-end device 44 on the cable 26 sends a data packet, the Vbus wire does not appear to the USB PD device 22 to be shorted any more. While waiting for the first packet, transistor Q1 is closed while transistors Q2-Q4 are open. The following steps can be followed according to one embodiment to determine cable type:

1. When the squelch RX 40 and/or FSK modem 34 detects a data packet arriving, close transistors Q2 and Q3 (transistor Q1 remains closed).
2. If the squelch RX 40 and/or FSK modem 34 detects a packet, there is not a capacitor coupling the ID and GND pins as shown in FIG. 11A. The cable type is Legacy. Close transistor Q1, and open transistors Q2-Q4. Exit the procedure.
3. Else, open transistors Q2 and Q3 (transistor Q1 remains closed).
4. If the squelch RX 40 and/or FSK modem 34 detects a packet, there is a capacitor coupling the ID and GND pins as shown in FIG. 12A. The cable type is PD (3 A). Close transistor Q1, and open transistors Q2-Q4. Exit the procedure.
5. Else, the cable type is still unknown. Close transistor Q1, and open transistors Q2-Q4. Exit the procedure.

Note that following this procedure may cause the packet CRC to fail. The protocol handles this failure and causes more packets to be sent. After some attempts, if the cable-type is still undetermined, the device may choose to assume it is a legacy cable. Alternatively, to avoid causing issues in the policy engine the device may choose to perform the cable-type detection mechanism on a subset of the arriving packets. This ensures that packets that are retried will be processed as the policy engine expects avoiding hard resets that would disrupt the normal USB PD operation. For example, only every other packet could be used.

Micro-AB Receptacle

A USB PD device 22 with a Micro-AB receptacle 24 could be any type of USB PD device (C/P, C-only, P/C, P-only). According to the USB-PD system, the first data packet that the device 22 receives from the far-end device 44 of the cable 26 is more than likely either a Capabilities message, a HardReset packet, a BitStream, or a Get_source_cap message. It may also send a Get_source_cap message, SoftReset message, or a capabilities message, in which case it may receive a GoodCRC message.

In this situation, the possible cable-types cannot be narrowed down from the initial cable-type detection attempt. As a result, the entire procedure can be performed but in a different order as shown below. Determining the value of bit1 last is necessary because the device does not control the duration of the arriving packet. Therefore, the last step checks that the packet is still arriving which means the values of bit2 and bit3 were determined while there was a signal present.

1. When the squelch RX 40 and/or FSK modem 34 detects a packet arriving, close transistors Q2 and Q3 and open transistor Q1 (transistor Q4 remains open).
2. Check Squelch→if open, set bit2 to "1", else set bit2 to "0"
3. Close transistor Q4 (transistor Q1 remains open).
4. Check squelch→if open, set bit3 to "1", else set bit3 to "0"
5. Close transistor Q1, and open transistors Q2-Q4.
6. Check squelch→if open, set bit1 to "1", else set bit1 to "0"

The cable-type is again determined using the values in bit1, bit2, and bit3 along with Table 3. If the cable-type is still unknown, the USB PD device 22 can wait for the next data packet and try again. After some attempts, if the cable-type is still undetermined, the device 22 may choose to assume it is a legacy cable. Note that following this procedure may cause the packet CRC to fail. The protocol handles this failure and cause more packets to be sent. Alternatively, to avoid causing issues in the policy engine the device may choose to perform the cable-type detection mechanism on a subset of the arriving packets. This ensures that packets that are retried will be processed as the policy engine expects avoiding hard resets that would disrupt the normal USB PD operation. For example, only every other packet could be used.

According to the procedures of the embodiments outlined above, the USB PD device may complete cable-type detection only after receiving a packet from the far-end of the cable. For devices that are sources, this means that the capabilities they offer may change after receiving a packet from the far end of the cable since they may increase the current they offer beyond 1.5 A (the legacy cable limit). For devices that are sinks, this means that the current they request may exceed 1.5 A (the legacy cable limit). The procedures described above could be modified to work with other existing or future cable-type detection circuits.

All of these approaches are generally illustrated in FIG. 13, where the method 50 includes a device at the far end of a USB cable sending a signal over the cable (step 52) and a USB PD device at the near end of the cable receiving the signal (step 54). The method 50 also includes the USB PD device determining the cable-type of the USB cable based on the received signal (step 56). At that point, the USB PD device establishes a sink or source current or other aspect of the cable's use as a function of the determined cable-type (step 58).

Although the above description has described specific embodiments of a cable-type detection mechanism, various changes may be made to the detection mechanism. For example, the detection mechanism is not limited to use with the circuit of FIG. 7 or FIG. 10. Moreover, the detection mechanism has been described as assuming a limited number of potential USB cable types, such as specific receptacles (standard-B, micro-B, and micro-AB) and currents (1.5 A, 3 A, and 5 A). However, the detection mechanism described above can be modified to support the use of any suitable receptacles (now existing or developed later) and currents, voltages, or other operating characteristic(s).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a universal serial bus (USB) cable having a near end and a far end and including a Vbus wire;
a first device having a receptacle configured to be coupled to the near end of the USB cable; and
a second device configured to be coupled to the far end of the USB cable, the second device configured to generate a frequency shift keying (FSK) signal on the Vbus wire;
wherein the first device is configured to determine a power rating of the USB cable by detecting a capacitor in the USB cable at the far end thereof coupling a portion of the FSK signal to another wire within the USB cable enabling the first device to receive and process the signal from the second device through the receptacle, the processed signal utilized to determine the current carrying capacity of the USB cable.

2. The system as specified in claim 1, wherein:
the receptacle has an ID pin and a Vbus pin; and
the first device is configured to detect a presence of a capacitor coupled between the ID pin and the Vbus pin as a function of the signal received from the second device.

3. The system as specified in claim 1, wherein:
the receptacle has an ID pin and a ground pin; and
the first device is configured to detect a presence of a capacitor coupled between the ID pin and the ground pin as a function of the signal received from the second device.

4. The system as specified in claim 1, wherein the first device is configured to deliver power to the USB cable while simultaneously detecting a presence of the signal from the second device.

5. The system as specified in claim 1, wherein the first device is configured to adjustably establish the power delivered by the first device to the USB cable as a function of a presence of the signal and not a content of the signal.

6. The system as specified in claim 1, wherein the first device is configured to establish the amount of power delivered by the first device to the USB cable as a function of the determined power rating of the USB cable.

7. The system as specified in claim 1, wherein the signal comprises one of: a GoodCRC control message, a Ping control message, a HardReset packet, a Get_sink_cap control message, a Get_source_cap control message, a BitStream message, and a Capabilities message.

8. The system as specified in claim 1, wherein the second device is configured to limit the amount of power delivered by the first device to the USB cable as a function of the determined power rating of the USB cable.

9. A method of determining a power rating of a Universal Serial Bus (USB) cable extending between a first device coupled to a near end of the USB cable and a second device coupled to a far end of the USB cable, the method comprising the steps of:
receiving a frequency shift keying (FSK) signal from the second device at the first device; and
determining the power rating of the USB cable using the signal by detecting a capacitor in the USB cable at the far end thereof coupling a portion of the FSK signal to another wire within the USB cable enabling the first device to receive and process the signal from the second device through the receptacle, the processed signal utilized to determine the current carrying capacity of the USB cable.

10. The method as specified in claim 9, wherein:
the first device comprises a receptacle having an ID pin and a Vbus pin; and
determining the power rating of the USB cable comprises detecting a presence of a capacitor coupled between the ID pin and the Vbus pin as a function of the signal received from the second device.

11. The method as specified in claim 9, wherein:
the first device comprises a receptacle having an ID pin and a ground pin; and
determining the power rating of the USB cable comprises detecting a presence of a capacitor coupled between the ID pin and the ground pin as a function of the signal received from the second device.

12. The method as specified in claim 9, wherein the first device delivers power to the USB cable while simultaneously detecting a presence of the signal from the second device.

13. The method as specified in claim 9, wherein the first device adjustably establishes the power delivered by the first device to the USB cable as a function of a presence of the signal and not a content of the signal.

14. The method as specified in claim 9, wherein the signal comprises one of: a GoodCRC control message, a HardReset packet, a Get_sink_cap control message, a Get_source_cap control message, a BitStream message, a Ping message, and a Capabilities message.

15. The method as specified in claim 9, wherein the first device adjusts the power it delivers to the USB cable as a function of the determined power rating.

16. The method as specified in claim 9, wherein the second device limits the power delivered to the USB cable by the first device as a function of the determined power rating.

17. An apparatus comprising:
   a controller configured to receive a frequency shift keying (FSK) signal sent to a first device coupled at a near end of a Universal Serial Bus (USB) cable from a second device coupled at a far end of the USB cable;
   the controller configured to determine a power rating of the USB cable based on the received signal by detecting a capacitor in the USB cable at the far end thereof coupling a portion of the FSK signal to another wire within the USB cable enabling the first device to receive and process the signal from the second device through the receptacle, the processed signal utilized to determine the current carrying capacity of the USB cable.

18. The apparatus as specified in claim 17, wherein the controller is configured to adjust the amount of power delivered by the first device to the USB cable as a function of the determined power rating.

19. The apparatus as specified in claim 17, wherein the controller is configured to limit the amount of power delivered by the second device to the USB cable as a function of the determined power rating.

20. The apparatus as specified in claim 17, wherein:
   the first device comprises a receptacle having an ID pin and a Vbus pin; and
   the controller is configured to determine the power rating of the USB cable by detecting a presence of a capacitor coupled between the ID pin and the Vbus pin as a function of the signal received from the second device.

21. The apparatus as specified in claim 17, wherein:
   the first device comprises a receptacle having an ID pin and a ground pin; and
   the controller is configured to determine the power rating of the USB cable by detecting a presence of a capacitor coupled between the ID pin and the ground pin as a function of the signal received from the second device.

22. The apparatus as specified in claim 17, wherein the controller is configured to adjustably establish the power delivered by the first device to the USB cable as a function of a presence of the signal and not a content of the signal.

23. The apparatus as specified in claim 17, wherein the signal comprises one of: a GoodCRC control message, a HardReset packet, a Get_sink_cap control message, a Get_source_cap control message, a BitStream message, a Ping control message, and a Capabilities message.

* * * * *